May 24, 1927. 1,630,126
A. J. B. MARSAT
CAP OR SOCKET FOR INCANDESCENT ELECTRIC LAMPS AND THE LIKE
Filed Jan. 26, 1925

Inventor.
Antoine Jean Baptiste Marsat
by Munn &Co.
Attorneys

Patented May 24, 1927.

1,630,126

UNITED STATES PATENT OFFICE.

ANTOINE JEAN BAPTISTE MARSAT, OF VERRIERES-LE-BUISSON, FRANCE.

CAP OR SOCKET FOR INCANDESCENT ELECTRIC LAMPS AND THE LIKE.

Application filed January 26, 1925, Serial No. 4,849, and in France February 6, 1924.

The present invention relates to incandescent electric lamps and the like, and has for its object to enable a well-defined position to be given to the filament with respect to the fixing parts of the cap or socket, the latter being made in two parts, the one interior, which is fixed with respect to the bulb and has a spherical part the other exterior and cylindrical which carries the fixing parts and the two parts of the socket being soldered together in order to fix them with respect to each other in a definite manner, when the adjustment has been effected.

In practice the operation of soldering the two parts presents somewhat great difficulties. It is necessary, in order that the solder may take well, that the two parts be brought to a sufficiently high temperature and, as far as possible, to the same temperature. Now in the case under consideration, it is not easy to heat the interior part. Further, it is necessary that the solder covers those places where the two parts of the socket only leave a very small space between them; this space is at a certain distance from the edge of the exterior part and not readily accessible. Finally, the blow-pipe or soldering iron must not be caused to approach too near to the bulb, which might cause this latter to be fractured.

With a view to remedying these inconveniences, the first method which would occur to a practical man would consist in first, tinning the two parts which require to be connected together, then placing them one in the other and causing the fusion of the tin by applying the soldering iron or blow-pipe, judging the spot where it is presumed the two parts are in contact. This process would have many inconveniences; it is difficult to give to the layer of tin a very regular thickness which is necessary in order that the two parts may articulate one with respect to the other without play; if this tinning is carried into effect before placing in position the vitreous block, which forms the bottom of the outer socket, at the moment when this vitreous block is placed in position, the tin will melt, will flow and will only have an irregular thickness and will collect where it is useless, leaving bare the higher part where it would be necessary; if an attempt is made to tin the sockets provided with their vitreous blocks, it will frequently happen that this block will crack and become unfit for use. In this method the workman will not be able to see the moment at which the tin melts and he will be obliged to stop the heating quite by chance; he cannot be sure that the solder has properly connected the two parts. Finally, when introducing the interior part into the exterior part it would be possible to enlarge this latter without being aware of it.

The present invention enables one to avoid all these inconveniences. It consists in providing the exterior part with little openings placed preferably in front of the most projecting portion of the interior part which enables one to act directly upon the interior part and thus to reduce the difference of temperature between it and the exterior part, and further, to effect the soldering in the immediate neighbourhood of the line of contact between the interior part and the exterior part; that is to say, at the point where it has the greatest chance of holding well without causing the soldering iron or the blow-pipe employed for this soldering operation to approach too near to the bulb.

In order that the invention may be better understood, there has been represented in the accompanying drawing given by way of example only, a method of carrying the invention into effect.

Figure 1:
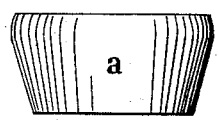
Fig. 1 is a view in elevation of the interior part of the socket.
Figure 2:
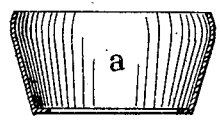
Fig. 2 is a vertical section of the same.

As shown in the drawing, the interior part of the socket is formed of a metal part $a$ Figs. 1 and 2 having the form of a cone terminated by a rounded part. It may also be in the form of a toric ring, a spherical zone, etc.

Figure 3:
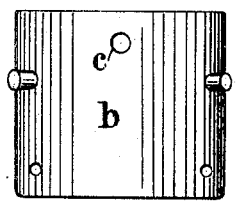
Fig. 3 is a view in elevation of the exterior part of the socket.
Figure 4:
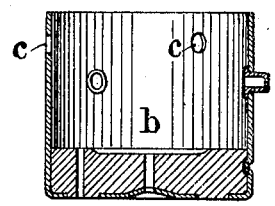
Fig. 4 is a vertical section.
Figure 5:
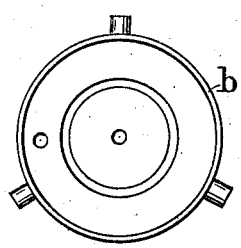
Fig. 5 is a plan view corresponding to Fig. 3.

The exterior part $b$ is cylindrical in Figs. 3 to 5. It results that if the two parts $a$ and $b$ are engaged one in the other their respective positions may be modified as desired. For example, if the part $a$ is fixed with respect to the bulb and the filament and the part $b$ is placed in an adjusted apparatus, it is possible to determine the exact position of the two parts $a$ and $b$ with respect to each other, so that the filament occupies the desired position so that when the lamp is in operation the filament is exactly in the focus of the projection apparatus.

The part $b$ is provided with openings $c$, the number, the form and the size of which may be varied according to circumstances.

Figure 6:
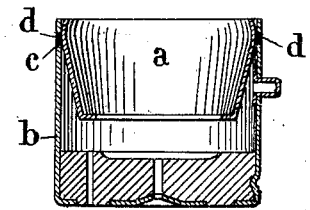
Fig. 6 shows in section the two parts assembled.

The two parts $a$ and $b$ being placed as desired, as just above explained, they are fixed in this position by soldering them at the position of the openings $c$; Fig. 6 shows a spot of solder placed at $d$ connecting the two parts $a$ and $b$.

It is evident that the soldering is easily carried into effect in the position of the said openings. It is possible to heat the interior part through these latter and the solder placed between these two heated parts slightly separated acts surely and connects them solidly.

Instead of soldering, the two parts may be brazed. In this case the openings $c$ permit the heating of the part $a$ by means of the flame of the blow-pipe employed for brazing, as they permit the heating with the soldering iron. The advantages of the new construction are the same as those obtained in the case of soldering.

Instead of openings arranged in certain places, a large number of openings may be arranged regularly over the whole surface, so that the whole of the wall of the part $b$ is perforated, which would still further facilitate the heating of the interior part.

The invention is not only applicable to electric lamps, but also to certain scientific apparatus, such as thermostats, thermo-electric batteries, photo-electric batteries, etc., which are placed in bulbs similar to incandescent electric lamp bulbs, and which also, in order to give a good effect, should occupy a very definite position.

The above arrangements are only given by way of example; the forms, dimensions, materials employed and all detail arrangements may be varied without changing the principle of the invention.

Claims:

1. In electric incandescent lamps and the like, a plug in two parts, the interior one being fixed with respect to the bulb and having a spherical part, whereby the parts can be inclined in all directions to one another, the exterior one being cylindrical and carrying means by which it may be secured in position, the exterior part having openings adapted to receive the solder or brazing mixture for connecting the exterior part with the interior part.

2. In electric incandescent lamps and the like a plug in two parts, the interior one being fixed with respect to the bulb and having a spherical part, the exterior one being cylindrical and carrying means by which it may be secured in position, the exterior part having openings adapted to receive the solder or brazing mixture for connecting the exterior part with the interior part, the openings being arranged in such a position that the tangency line of the spherical part and of the cylindrical part is before these openings, when the adjustment has been effected.

The foregoing specification of my "improvement in caps or sockets for incandescent electric lamps and the like" signed by me this 16th day of January, 1925.

ANTOINE JEAN BAPTISTE MARSAT.